Jan. 12, 1954

E. L. ALLEN ET AL 2,665,934

DOOR CONTROL MECHANISM

Filed July 10, 1947

INVENTORS.
EDWIN L. ALLEN
RUDOLPH I. SCHONITZER
BY Bosworth & Sessions
ATTORNEYS

FIG. 4

Jan. 12, 1954 E. L. ALLEN ET AL 2,665,934
DOOR CONTROL MECHANISM
Filed July 10, 1947 7 Sheets-Sheet 4

INVENTORS.
EDWIN L. ALLEN
RUDOLPH I. SCHONITZER
BY Bosworth & Sessions
ATTORNEYS

Patented Jan. 12, 1954

2,665,934

UNITED STATES PATENT OFFICE 2,665,934

DOOR CONTROL MECHANISM

Edwin L. Allen, Cleveland Heights, and Rudolph I. Schonitzer, Shaker Heights, Ohio, assignors, by mesne assignments, to said Schonitzer Application July 10, 1947, Serial No. 760,074

12 Claims. (Cl. 292—216)

This invention relates to door control mechanisms and more particularly to means for locking such mechanisms to prevent unauthorized opening of the door with which the mechanism is associated.

Although the present invention is illustrated and described herein in association with the door of an automotive vehicle it will be understood that our invention is applicable to many different types of closure members which require latching and locking apparatus.

The type of door control mechanism in which our present invention is incorporated may be broadly described as having coacting elements associated with the door and door frame structures whereby the door may be latched and held in closed position or released from closed position to permit opening thereof, and as including detent means whereby one of these coacting elements, which may be termed the latch member, is releasably retained in operative or door latched position when the door is closed. When the detent means of this type of mechanism is actuated by a suitable actuating unit, such as a push button or a handle device, to release the latch member and permit opening of the door the latch member is moved into operated or door unlatched position concurrently with opening movement of the door. Where the term "push button" is used herein it is intended to include all types of door latch actuating or controlling devices such as handles, levers, etc. as well as push buttons proper. The Rudolph I. Schonitzer United States Patents Nos. 2,094,413 and 2,156,874 which issued on September 28, 1937 and May 2, 1939 respectively, illustrate, describe and claim door control mechanisms of this type. The present invention relates to improvements in this general class of door control apparatus.

In door control mechanisms such as those described in the said Schonitzer patents it is customary to provide means for locking the mechanism to prevent unauthorized opening of the door. In the devices of the said Schonitzer patents the locking means comprises generally a restraining or locking member supported to be moved into and out of a restraining or locking position in which the restraining member blocks the mechanism to prevent movement of the latch unit from operative or door latched position to operated or door unlatched position.

In the copending patent application of Edwin L. Allen, Serial No. 746,521, filed May 7, 1947 a latch mechanism having a movable latch unit and a detent for releasably retaining the latch unit in door latched position is disclosed and claimed. This Allen copending application also discloses and claims certain improvements in locking means for preventing movement of the latch unit when the door is closed and latched, thus preventing unauthorized entry. The apparatus of the present application has certain features in common with said copending Allen patent application which features are claimed therein and accordingly cross-reference is hereby made to said Allen copending application.

In the devices specifically illustrated in the said Schonitzer patents and in the said Allen copending application, Serial No. 746,521 the restraining or locking means for blocking the mechanism to prevent unauthorized operation thereof effects its locking action by preventing tripping or moving of the detent from latch holding to latch released position. Locking arrangements of this type provide effective and satisfactory locking action but, as the detent in such devices is usually controlled and actuated through a push button disposed on the outer side of the door (and also on the inner side of the door in most cases), when the mechanism is locked to prevent movement of the detent and latch member movement of the push button from door latched to door released position is also prevented. In some cases such an arrangement is considered undesirable because, in an effort to open the locked door by pressure on the push button, excessive force may be applied thereto with the resulting damage to the mechanism.

To avoid the possibility of such damage it has been proposed to provide means for idling or "free wheeling" the inside and outside actuating push buttons in such a manner that the buttons may have substantially the same movement when force is exerted thereon by the operator, regardless of whether the latch mechanism is locked or unlocked. Such an arrangement is described and claimed in the Edwin L. Allen copending U. S. patent application, Serial No. 713,220, filed November 30, 1946, and other means for idling the outside push button or handle are described and claimed in the Edwin L. Allen, Angelo R. DeVito and Harold B. Muster pending U. S. patent application, Serial No. 723,330, filed January 21, 1947 now Patent No. 2,587,583 issued March 4, 1952. Reference is hereby made to said copending patent applications.

It is among the objects of the present invention to provide an improved and simplified push button idling mechanism for door latching and locking devices wherein the elements which accomplish the idling effect are incorporated directly in the latch structure proper.

Other objects of our invention include: the provision in a door control mechanism, having a latch unit and a detent adapted releasably to retain said latch unit in door latched position, of means for locking the latch unit against movement into door unlatched position while permitting movement of the detent and its associated actuating push button or the like to and from latch released position; the provision of means for locking a door control mechanism of the type described to prevent unauthorized opening of the door while permitting idling operation of the actuating push button wherein the detent member has its normal movement during such idling operation; the provision of push button idling means for door control mechanisms which occupies a minimum of space and may be incorporated in the latch mechanism without increasing the overall dimensions thereof; the provision of latch locking means for door control mechanisms which may be freely moved into and out of locked position; the provision of a door control mechanism which permits idling operation of the detent member when the latch is locked and provides for return of the detent to latch holding position without interference from other components of the mechanism; and the provision of a simple, rugged, effective and economical push button idling mechanism for latches of the type described.

The above and other objects of our invention will appear from the following description of several embodiments thereof reference being had to the accompanying drawings in which.

The door control mechanisms illustrated and described herein are designed particularly for use with automobile doors but are not, of course, limited to such use. As has been previously explained, it has been proposed to provide means for permitting lost motion or idling movement of the latch actuating push button or the like of a door control mechanism whereby, when the door is locked, the push button may be moved from door latched position to door released position without causing release of the door latch. The present invention contemplates means for accomplishing this result wherein the latch unit is positively held by the locking members to prevent opening of the door while the detent and its associated parts may be moved out of latch holding position and returned thereto. In the type of door control mechanisms herein described, when the door is latched, the detent engages the latch unit to prevent movement thereof in unlatching direction. Spring means are usually provided urging the latch unit in unlatching direction and therefore there is normally pressure between the latch unit and the detent at their points of engagement when the door is closed and latched. In order to eliminate the necessity for extreme manufacturing accuracy in forming and assembling the parts of the mechanism and to prevent the latch unit from moving in unlatching direction when the detent is idled out of engagement therewith, which movement of the latch unit would prevent proper reengagement of the detent with the latch unit on release of the idling pressure against the push button, we provide means whereby the latch unit is not only locked against movement in unlatching direction when it is desired to prevent unauthorized opening of the door but is also actually backed-up or moved in latching direction slightly beyond its normal door latched position. By so backing up the latch unit positive clearance is provided between the latch unit and detent during idling which permits free return of the detent to latch holding position upon release of pressure against the push button.

Also, this arrangement, as will appear from the accompanying description of our apparatus, makes it possible for sufficient clearance to be provided between the latch blocking or locking member and the latch unit whereby the locking mechanism may be freely moved into and out of locking position. This permits the parts to be made relatively small and light and greatly facilitates both the direct manual and the key controlled movement of the locking mechanism into and out of locking position.

Under tool room conditions it might be possible to produce door control apparatus, provided with means for blocking the latch against movement in unlatching direction, in which the parts would be so accurately made and the clearances would be so small that the latch unit could be blocked and the detent idled out of and back into latch holding position without interference upon the return movement thereof. However it is not commercially feasible to hold such standards of accuracy in mass production and accordingly we have incorporated in our apparatus means for backing up the latch unit from its normal door latched position to insure sufficient clearance to permit free return of the detent after idling movement thereof in latch releasing direction.

Figures 1, 2:
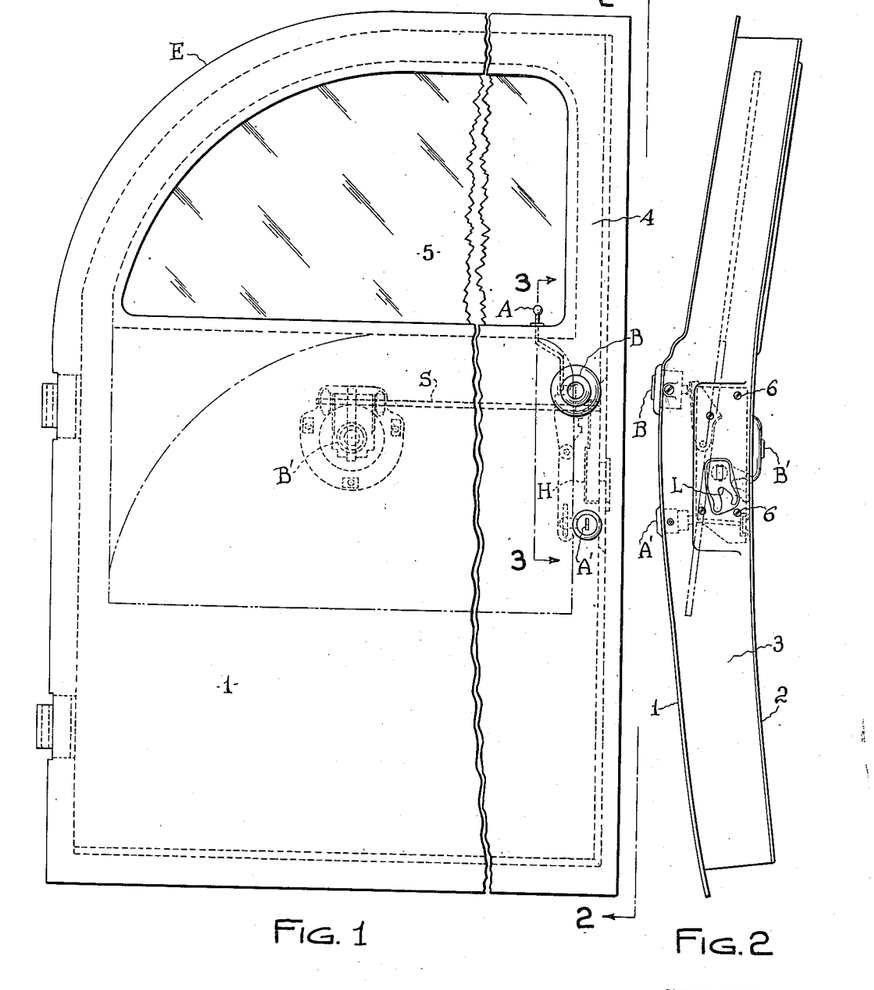
Figure 1 is a side elevation of the left-hand front door of an automobile, the door being hinged at its forward edge and incorporating our improved door control mechanism.
Figure 2 is a rear or free edge view of the door and door control mechanism shown in Figure 1, taken on line 2—2 of Figure 1.

In Figure 1 of the drawings the door E is provided with the usual outer panel 1 and inner panel 2 and the free edge wall 3 closes the rear edge of the door structure and forms the outer wall of the door lock pillar 4. The glass 5 is supported in a glass run channel in the usual manner and suitable means (not shown) are provided for raising and lowering the glass.

A tripper type door control mechanism having a main frame or housing generally indicated at H is mounted on the inner face of the free edge wall 3 of the door as by screws 6. The movable latch member L is supported by the housing H adjacent the outer surface of the free edge wall 3 for movement substantially parallel thereto. It will be understood that a suitable keeper pin or the like (not shown) is mounted on the adjacent door frame (also not shown) and that the latch member L and the keeper pin cooperate to effect latching of the door. An outside actuating member in the form of a push button assembly B is located on the outer panel 1 and an inner remote control actuating member in the form of a push button assembly B' is located on the inner panel 2. In Figure 1 the manually operable inside actuating means A for the latch restraining or locking means is disposed at the lower rear edge of the window opening and an outside key controlled actuating unit A' for the locking or restraining means is mounted in the outer panel 1 below the push button B. The above brief description is given to assist in an understanding of the general arrangement of our apparatus in a typical automobile door and the essential elements will be described more in detail later.

Aside from our improved mechanism for locking the door control unit in door latched position while permitting idling of the push button the illustrated apparatus is substantially the same as that described in detail and claimed in said copending United States patent application of Edwin L. Allen, Serial No. 746,521, filed May 7, 1947. Accordingly, only sufficient description of the elements which are common to this application and said copending application will be given herein for an understanding of the operation of the mechanism.

Figure 3:
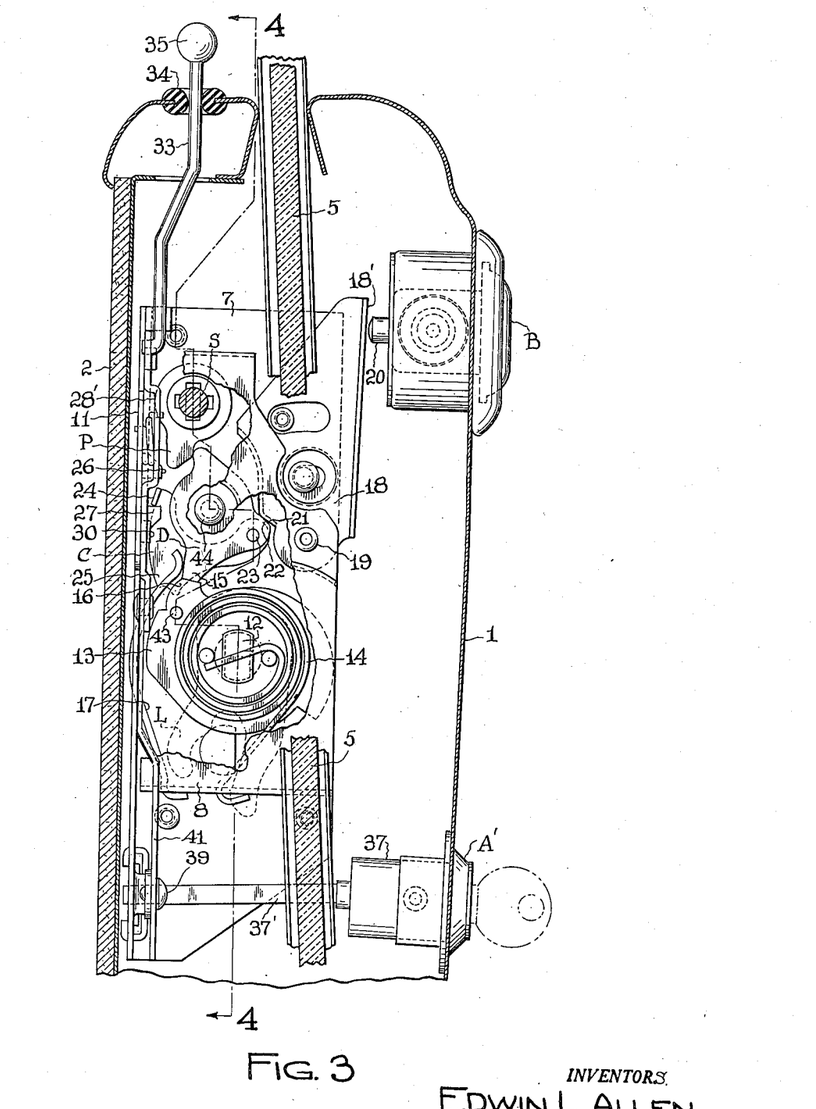
Figure 3 is an enlarged vertical cross-sectional view, taken substantially on line 3—3 of Figure 1, illustrating one embodiment of our door control mechanism installed in a door with the latch unit in operative or door latched position and the locking or restraining means in latch free or door unlocked position, portions of the cover plate of the mechanism being broken away more clearly to show the working parts thereof.
Figure 4:
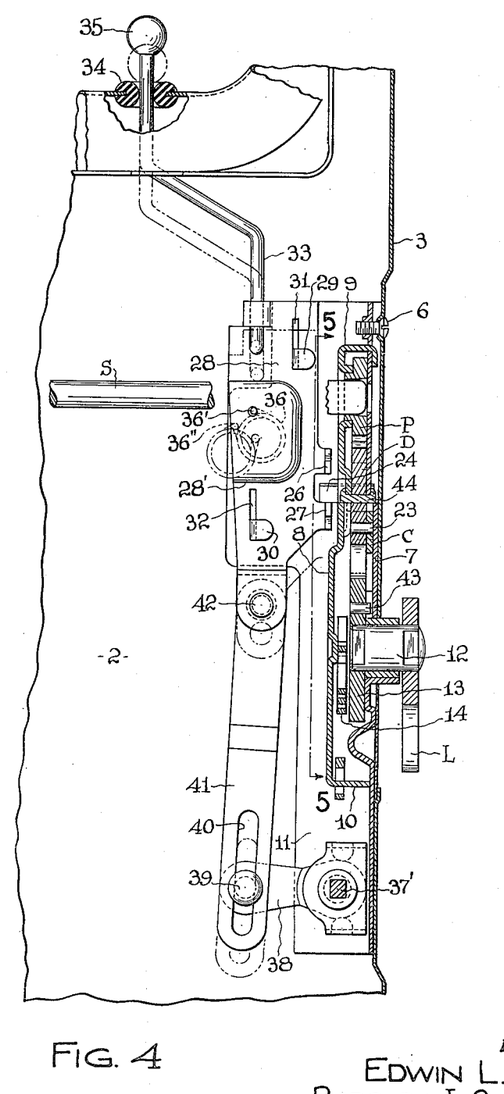
Figure 4 is a vertical cross-sectional view taken substantially on line 4—4 of Figure 3.

Referring to Figures 3 and 4, the housing H includes a base plate 7, a cover plate 8, end walls 9 and 10, and an edge wall or flange 11 preferably formed integrally with the base plate 7. The latch member L is secured to a shaft 12 rotatably mounted in suitable bearings carried by the base plate 7. At the inner end of shaft 12 is secured a latch control element 13 which, together with latch member L and shaft 12 form what may be termed the "latch unit." It will be understood where the term "latch unit" is used in this specification and the appended claims it is intended to refer to and include the latch member proper of a tripper type door control mechanism together with the parts which are movable concurrently with the latch member proper and are employed for effecting and controlling its operation.

Figure 6:
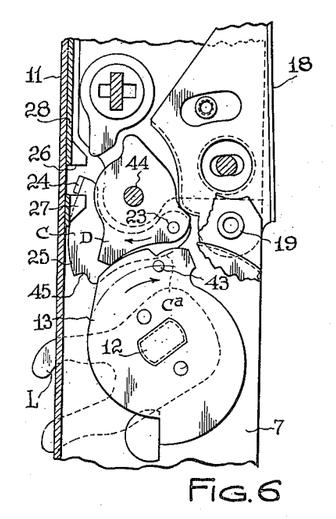
Figure 6 is a view similar to Figure 5 but showing the parts in the positions they assume after the actuating push button or the like has been moved to cause the detent to release the latch mechanism, the latch mechanism being illustrated in operated or door unlatched position.

As seen in Figures 3 and 4 the latch member L is in operative or door latched position in which it engages a suitable keeper (not shown) mounted on the door frame and thus holds the door in closed position. Spiral spring 14 is anchored at its lower end to the housing H and is secured at its upper end to the latch control element 13. This spring exerts a force on the latch unit tending to urge same from its operative or door latched position as seen in Figures 3 and 4 into operated or door unlatched position as seen in Figure 6. As will be understood by those skilled in the art, when in operated or door unlatched position the latch member L may be freely moved away from the keeper member on the door frame to permit opening of the door, such an arrangement being clearly illustrated and described in said above identified United States patents of Rudolph I. Schonitzer.

The detent D is pivotally supported at 44 between the plates 7 and 8 of the housing H and is provided with an abutment portion 15 adapted to engage a coacting abutment 16 on the latch control element 13 to maintain the latch unit in door latched position as seen in Figure 4. A spring 17, carried by frame H, has its upper free end engaging the detent D and exerts a force thereon urging the detent toward its latch holding position (counterclockwise as seen in Figure 3). In order to move the detent from its latch holding position as seen in Figure 3 into latch released position as seen in Figure 6 a detent control member is provided in the form of an arm 18 pivotally supported in the housing H at 19. The upper end 18' of arm 18 is positioned to be engaged by the inner end 20 of the outside push button assembly B and it will be observed by referring to Figure 3 that when the push button B is moved inwardly from the position shown the arm 18 will be moved in counterclockwise direction about its pivot 19 causing the detent engaging face 21 thereof to engage the cam face 22 of the detent D and move the detent clockwise in latch releasing direction against the spring 17.

This movement causes disengagement of the abutment 15 of the detent D from the abutment 16 of the latch control element 13 and permits the latch unit to move clockwise in unlatching direction. When the door is open the latch member L is in its operated position as shown in Figure 6. During closing movement of the door the lower leg of the bifurcated portion of the latch member engages the keeper pin (not shown) on the door frame, causing the latch member L, the shaft 12 and the control element 13 to move in counterclockwise direction (Figure 3) until the detent D is moved into latch holding position by the spring 17 with the abutment 15 engaging the abutment 16.

The mechanism so far described is substantially the same as that illustrated and claimed in the said copending U. S. patent application of Edwin L. Allen, Serial No. 746,521, filed May 7, 1947. We will now describe our improved locking and push button idling mechanism as incorporated in the latch already described.

Pivotally secured to detent D at 23 is a latch blocking member in the form of a dog generally indicated at C. This dog lies between the detent D and the inner face of the base plate 7 and, as illustrated, is generally triangular in shape with the pivot 23 at one upper corner of the triangle, a positioning flange 24 at the other upper corner of the triangle, and a latch unit blocking portion 25 at the lower corner. As is best seen in Figures 4, and 5 to 8, the positioning flange 24 extends away from the base plate 7 through a suitable recess (not seen in the drawings) in the cover plate 8 and lies between the upper control flange 26 and lower control flange 27 on the latch dog control member 28. The control member 28 is supported on the edge wall 11 for sliding movement relative thereto by tangs 29 and 30 extending out from the wall 11 through slots 31 and 32 respectively in the control member 28. By means of this slot and tang arrangement the control member 28 is guided for substantially vertical movement, as seen in Figure 4, and its travel is limited by the length of the slots 31 and 32. Operating rod 33 is secured to the upper end of the control member 28 and extends upwardly through a suitable bushing or grommet 34 in the window frame portion of the door structure and is provided with a knob 35 to facilitate manual operation. It will be seen that rod 33 provides means for selectively positioning the member 28 and latch blocking member C in either latch free position or latch blocking position.

In order to retain the control member 28 either in its upper door unlocked position as seen in full lines in Figure 4 or in its lower door locked position as seen in phantom lines in Figure 4 we provide a snap-over spring 36 having its upper end 36' operatively connected to the control member 28 and its lower end 36'' secured to the edge wall 11. This spring is disposed in a recess formed between wall 11 and the struck out portion 28' of the control member 28. As the end 36' of spring 36 is above the end 36'' thereof when the control member 28 is in its upper or unlocked position the spring tends to hold the control member in said upper position. When the control member 28 moves into its lower or door locked position, as indicated in phantom lines in Figure 4, the end 36' of the spring 36 moves with member 28 to a position below the end 36'' thereof and thus, when in this position, spring 36 tends to hold the control member in its lower or door locked position.

In order to permit operation of the latch dog control member 28 from the outer side of the door a key controlled actuating unit A' is provided. Extending from the rotatable barrel 37 of unit A' is a shaft 37' the inner end of which is operatively connected to an arm 38 which has a pin and slot connection 39—40 with the link 41 which in turn is pivotally secured at 42 to the lower end of the latch dog control member 28. This particular mechanism for providing means for actuating the locking mechanism from the outside of the door forms no part of the present invention and is fully described and claimed in the said Edwin L. Allen, United States patent application, Serial No. 746,521, filed May 7, 1947, and it will suffice to point out here that the illustrated mechanism permits independent selective actuation of the latch dog control member 28 from either side of the door regardless of the position that member 28 may have been moved into from the other side of the door.

Figure 5:
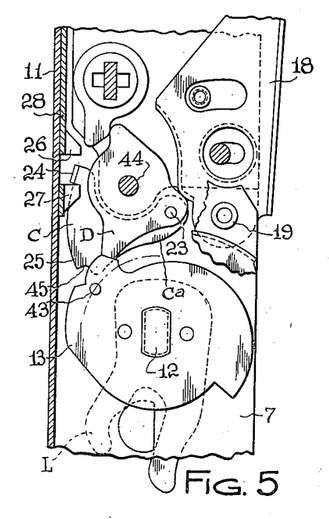
Figure 5 is a detached fragmentary view of our door control mechanism taken substantially on line 5—5 of Figure 4, the cover plate being removed for better illustration of the working parts, the latch unit being shown in operative or door latched position, and the locking mechanism being shown in latch free or door unlocked position.

The operation of the above described embodiment of our improved locking and push button idling mechanism will now be described with particular reference to Figures 5 to 8 inclusive. In Figure 5 the parts are shown in the same positions as in Figure 3, the latch dog control member 28 being in its upper or unlocked position. When in this position the lower control flange 27 of member 28 is disposed to engage and hold the positioning flange 24 of latch blocking member or dog C in a relatively elevated position and also to hold the lower latch unit blocking portion 25 of dog C in latch free position above the path of movement of blocking pin 43 which projects inwardly from the inner face of latch control element 13 toward the base plate 7. In Figures 5 and 6 the path of movement of the pin 43, which necessarily moves about the same center as shaft 12, is indicated in dot and dash lines. When the dog C is held in its latch free position, shown in Figure 5, by the control member 28 the detent D may be moved in clockwise direction into latch released position, as seen in Figure 6, by pressure on the push button transmitted through arm 18. This movement of the detent D will cause the pivot 23 of the dog C to move about detent supporting pin 44 but, as the positioning flange 24 of dog C is held up by flange 27 of latch dog control member 28, the latch unit blocking portion 25 of dog C cannot drop downwardly into the path of movement of blocking pin 43. Thus when the knob 35 is in its upper position as seen in Figures 3 and 4 the latch dog control member 28 will also be in its upper, latch free or unlocked position and the control flange 27 thereof will maintain the dog C in latch free position out of blocking engagement with the latch unit and, when the push button B is moved inwardly, the detent D will release the latch unit permitting movement thereof into operated or door unlatched position as seen in Figure 6.

Figure 7:
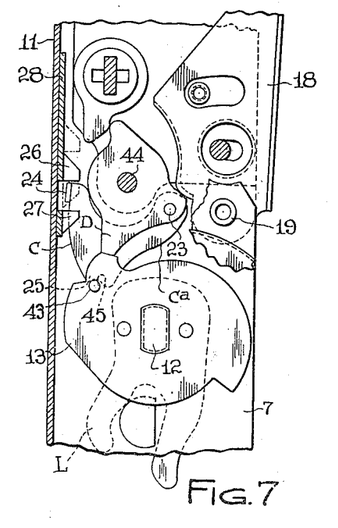
Figure 7 is a view similar to Figure 5 but showing the locking or restraining members in their initial latch blocking or door locked positions, the latch unit being in door latched position and the detent being in latch holding position.
Figure 8:
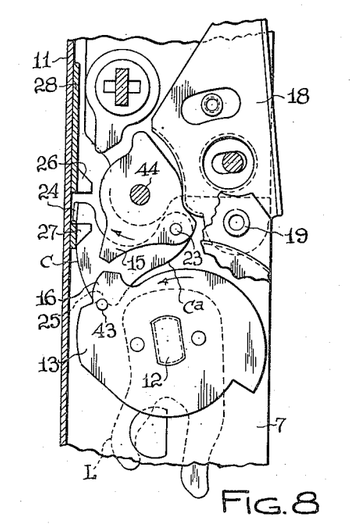
Figure 8 is a view generally similar to Figure 7, the locking members being shown in their secondary latch blocking or door locked positions, the push button having been actuated to move the detent into latch released position causing the latch element to be "backed-up" in latching direction to provide free return of the detent to its latch holding position when pressure on the push button is released.

In order to lock the door to prevent unauthorized opening thereof it is only necessary to move the latch dog control member 28 downwardly into its locking position as seen in phantom lines in Figure 4 and in full lines in Figures 7 and 8, either by pushing down on the inside actuating knob 35 or by turning the key in the outside key controlled actuating unit A'. During such movement of the control member 28 into full locked position shown in solid lines in Figures 7 and 8 the upper control flange 26 of member 28 engages the upper edge of positioning flange 24 of dog C causing the dog C to drop downwardly about its pivot point 23 until the notch 45 of the blocking portion 25 engages the blocking pin 43 on the latch control element 13. This position of the parts, which may be termed their initial latch blocking or locking position, is seen in Figure 7 and it will be observed that engagement of the notch 45 with pin 43 prevents further downward movement of the dog C at this time although there is clearance between the lower edge of positioning flange 24 and the lower control flange 27.

With the parts in the position shown in Figure 7, when the push button B (seen in Figures 1, 2 and 3) is moved inwardly swinging the arm 18 about its pivot 19 into the position shown in Figure 8 the detent D will be moved in clockwise direction causing the pivot pin 23 to move generally downwardly about the center 44. This downward movement is transmitted through the dog C, which acts as an interconnecting link and extends between the detent D and the latch unit, to the pin 43 causing the latch control element 13 to be moved in latching direction or backed up beyond its normal door latched position as seen in Figure 7 into the backed-off position seen in Figure 8. The position of dog C shown in Figure 8 may be termed its secondary latch blocking or locking position. The backing up of the latch unit occurs simultaneously with the movement of detent D in latch releasing direction and causes the abutments 15 and 16 of the detent and latch control member to move apart slightly. When pressure is removed from the push button the spring 17 (see Figure 3) moves the detent counterclockwise in latch holding direction returning it to latch holding position, this return movement being facilitated because the dog C holds the abutment 16 of latch control element 13 backed off from its normal latched position until the detent D has returned at least partially into its latch holding position. During return of the detent D the dog C also reurns from its secondary blocking position back to its initial blocking position.

With the arrangement just described the abutment 16 is positively held out of the way of the abutment 15 during return of the detent D from idling movement. The door control push buttons, handles, or the like may be actuated at will when the door is locked without danger of damage to the latch mechanism or of releasing the latch, and without any possibility of interference which would prevent the detent from returning to latch holding position.

In the above description reference has been made to the idling action of the outside push button B. It is to be noted that the inside push button B' also has idling movement when the latch mechanism is locked. This desirable result is obtained without requiring any additional parts. The inside push button B' is operatively connected to the remote control shaft S which in turn is operatively connected to the detent engaging pawl P (see Figures 1, 3 and 4). Pressure on button B' rotates shaft S and pawl P, which is rotatably supported in housing H, and causes pawl P to engage the detent D and move same to release the latch unit. This action of the detent D is the same under the influence of inside push button B' as under outside push button B and therefore both the inside and outside push buttons may be idled when the latch mechanism is locked.

It will be noted that, in the mechanism shown in Figures 1–8, the latch dog control member 28 and dog C cannot move into full and effective locking position as seen in Figure 8 except when the latch unit is in operative or door latched position. If the control member 28 is urged down toward locking position when the latch unit is in operated or door unlatched position as seen in Figure 6 the lower edge portion $C^a$ of dog C will strike the pin 43 on latch control element 13 thus preventing movement of dog C and control member 28 fully into locked position.

In Figures 9 to 16 inclusive we have illustrated a modified form of our mechanism whereby the latch unit of a door control device is locked in door latched position while idling movement of the detent and its associated actuating member, such as a push button or the like, from latch holding position to latch released position and return is permitted. The modified locking and idling device is shown as incorporated in the same general type of latch mechanism as is illustrated in Figures 1 to 8 inclusive and accordingly like reference characters will be employed in referring to similar parts. Furthermore the arrangement and mode of operation of the latch unit, detent, etc. shown in Figures 9 to 13 inclusive will not be described in detail as they are substantially the same as previously explained. It is pointed out however that the door control mechanism of Figures 9 to 16 does not include an outside key controlled actuating means for the locking elements. Our improved locking and push button idling arrangements are, of course, applicable to door control mechanisms without outside key controlled actuating means as well as to those having outside key controlled actuators.

Figures 9, 10:
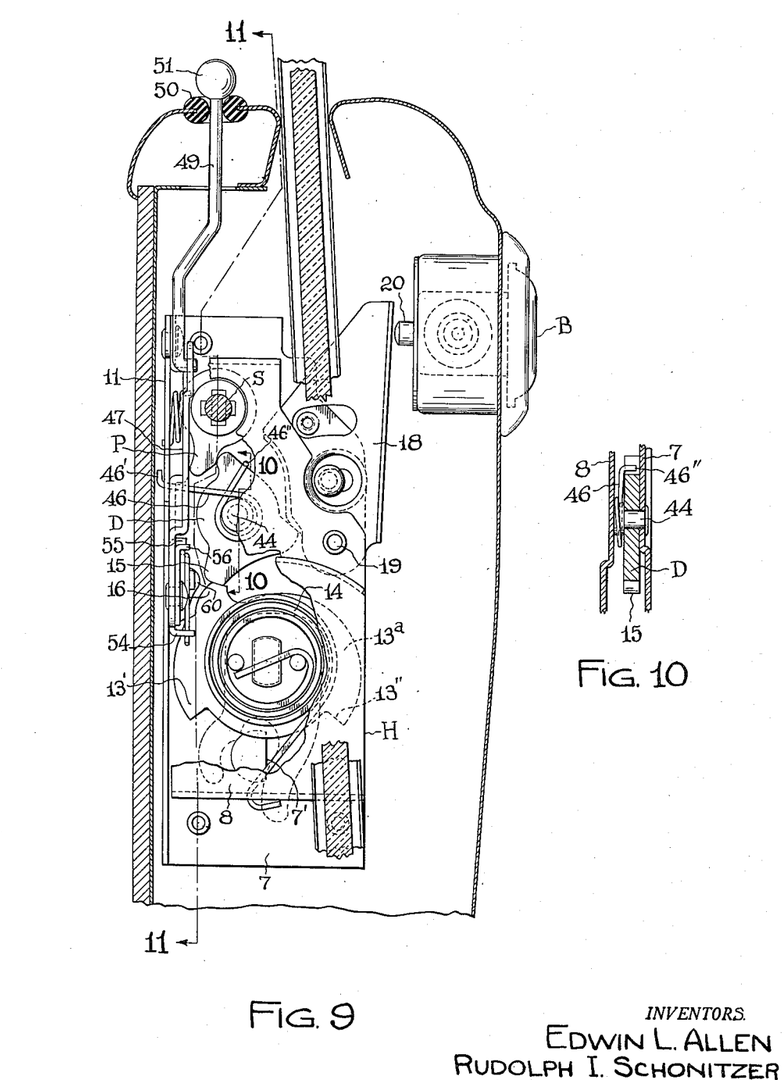
Figure 9 is a view generally similar to Figure 3 but illustrating a modified form of our latch restraining or locking mechanism, the latch unit being shown in operative or door latched position and the locking element being shown in latch blocking or door locked position.
Figure 10 is a fragmentary vertical cross-sectional view taken substantially on line 10—10 of Figure 9 illustrating the arrangement of the detent spring.

As is seen in Figure 9 the latch control element $13^a$ has an abutment portion 16 which is engaged by the abutment 15 on the detent D to hold the latch unit in operative or door latched position. Control element $13^a$ has a slightly different form from control element 13 of Figures 1–8 in that element $13^a$ is provided with a lug 13' spaced circumferentially from the abutment 16 for purposes which will be later described. The latch unit is urged in unlatching direction by the spiral spring 14 and a spring 46, having one end 46' in engagement with the edge wall 11 of housing H and having its other end 46" in engagement with detent D, urges the detent D in latch holding direction (counterclockwise in Figure 9). The spring 46 performs the same function as spring 17 in the embodiment of our invention shown in Figures 1–8 but is of a different form in order to permit disposition of our modified locking mechanism in the housing H.

Figure 11:
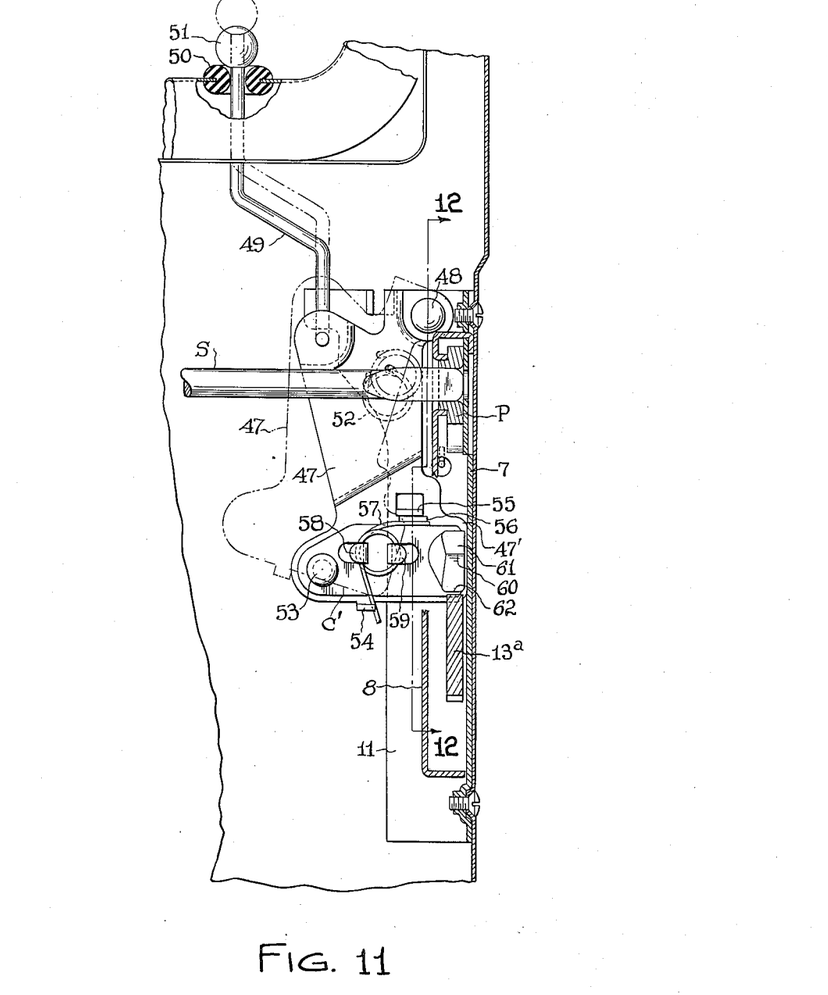
Figure 11 is a vertical cross-sectional view taken substantially on line 11—11 of Figure 9.

As is best seen in Figure 11, a movable latch dog support member 47 is pivotally secured at 48 to the edge wall or flange 11 and is provided with an actuating rod 49 extending up through a grommet 50 in the window moulding and having a knob 51 at its upper end. Moving the knob 51 up and down swings the dog support member 47 about its pivot 48 out of and into latch blocking or locking position and a snap-over spring 52, which may be similar in general arrangement to previously described snap-over spring 36, assists in holding the support member 47 in its retracted or unlocked position and its advanced or locked position. In Figures 9 and 11 the support member 47 is shown in its advanced or door locked position, the retracted or door unlocked position being illustrated in phantom lines in Figure 11.

Figure 14:
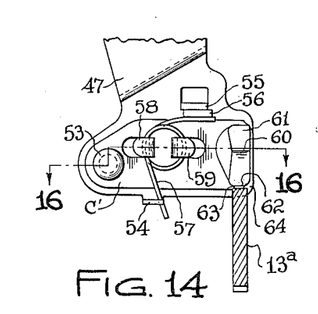
Figure 14 is a fragmentary view, taken substantially on line 14—14 of Figure 12, showing the latch blocking dog in its initial latch blocking or door locked position.
Figure 15:
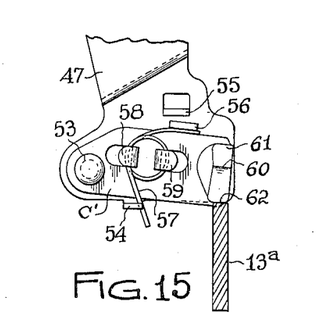
Figure 15 is a view similar to Figure 14, taken substantially on line 15—15 of Figure 13, and showing the latch blocking dog in the secondary latch blocking or door locked position.
Figure 16:
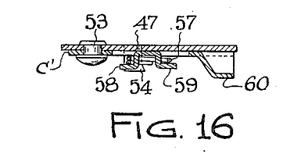
Figure 16 is a fragmentary horizontal cross-sectional view taken on line 16—16 of Figure 14 illustrating the latch blocking dog and it supporting member.

In order to block the latch unit against movement in unlatching direction out of door latched position we provide a latch blocking member in the form of a dog, generally indicated at C', which is pivotally mounted on the dog support member 47 at 53. Downward movement of the dog C' about its pivotal support 53 is limited by a projecting lug 54 formed on the support member 47 and upward movement thereof is limited by a lug 55 on the support member 47, a coacting lug 56 being formed on dog C'. In order normally to hold the dog C' in its upper position, with lug 56 engaging lug 55 on the support member 47, we provide a spring 57 one end of which bears against the underside of lug 56 and the other end of which bears against the lug 54 on support member 47. This spring 57 tends at all times to urge the dog C' in counterclockwise direction, as seen in Figures 11, 14 and 15, tangs 58 and 59 being struck out from the dog C' and bent over, as is clearly seen in Figure 16, to hold the spring 57 in place.

Figure 12:
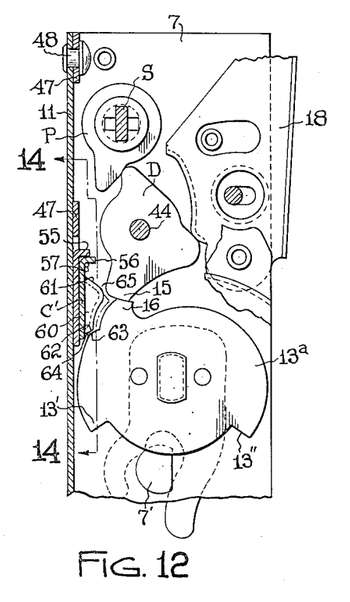
Figure 12 is a detached illustrative view taken substantially on line 12—12 of Figure 11, the cover plate of the door control mechanism being removed for better illustration of the operating parts, the latch unit and detent being shown in their door latched positions and the locking members being shown in latch blocking or door locked position.
Figure 13:
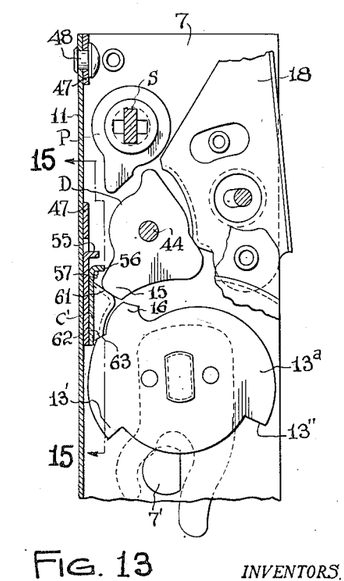
Figure 13 is a view similar to Figure 12 but showing the parts in the positions they assume after the actuating push button has been given idling movement to swing the detent toward its latch released position.

At the inner or free end of the dog C' is a blocking projection 60 having a detent engaging portion 61 and a latch control member engaging portion 62. The form of blocking projection 60 is best seen in Figures 12 to 16. When the latch unit is in operative or door latched position as seen in Figures 9, 11 and 12 the knob 51 may be pushed downwardly from its upper position (shown in phantom lines in Figure 11) to swing the dog support member 47 about its pivot 48 until the end 47' engages the base plate 7. This movement of course carries the dog C' with the support member 47 and moves the blocking projection 60 of dog C' into what may be termed its initial blocking position relative to the latch control element 13ª, it being noted from Figures 12 and 14 that the face 62 of blocking member 60 is disposed adjacent and above the abutment portion 63 of the control element 13ª. Conversely, when the button 51 is lifted from the full line position seen in Figure 11 into the phantom line position the support member 47 is swung away from the base plate 7, withdrawing the dog C' and blocking member 60 into latch free position completely out of the paths of movement of the latch control element 13ª and the detent D. Thus, when the support member 47 is in unlocked position the dog C' offers no interference whatever with the normal latching and unlatching movements of the mechanism.

It has been previously explained that in the apparatus of Figures 1–8 the locking mechanism cannot move all the way into full and effective door locked position except when the latch unit is in operative or door latched position. In the embodiment of our invention shown in Figures 9–16 the same result is obtained by means of a stop lug 13' formed on the latch control element 13ª. This lug 13' is spaced circumferentially on the periphery of element 13ª in door latching direction from the abutment portion 63 as is seen in Figure 12. When the dog C' is withdrawn (as seen in phantom lines in Figure 11) to unlock the door, and the detent D is actuated to release the latch unit, the element 13ª will rotate in door unlatching direction (clockwise as seen in Figure 12) until lug 13'' on element 13ª strikes projection 7' on the base plate 7. During this unlatching movement of element 13ª the stop lug 13' moves up into the path of blocking projection 60 between its unlocked and locked positions. Thus if the dog C' is urged toward locked position when the latch unit is in door unlatched position the blocking projection 60 will engage and be stopped by lug 13' on latch control element 13ª before projection 60 reaches locked position.

As shown in Figure 11 the snap-over spring 52 is arranged to change its direction of action on support member 47 before projection 60 engages lug 13' when moved in locking direction with the latch unit out of full latched operative position. This makes it possible to preset the latch for automatic locking by pushing down on knob 51 when the door is open. This feature of the illustrated mechanism is fully described and claimed in the copending U. S. patent application of Edwin L. Allen (one of the co-inventors herein), Serial No. 769,688, now Patent No. 2,480,638 dated August 30, 1949, and cross-reference is hereby made thereto.

The operation of the just described modified form of our invention may be understood by referring to Figures 12–16. In Figures 12 and 14 the support member 47 and latch blocking member or dog C' are shown in their initial latch blocking or locking positions, the latch control element 13ª is in its operative or door latched position, and the detent D is in its latch holding position with abutment 15 in engagement with abutment 16 of element 13ª. If pressure is now exerted on the detent control arm 18 through the push button B or other actuating means or if the inner push button B' is operated the detent D may move in clockwise direction into the position shown in Figure 13. During such movement the face of the abutment 15 engages and rides over the detent engaging portion 61 of blocking projection 60. The outer surface of detent engaging portion 61 is contoured to form a cam face so that the engagement of the detent therewith moves the dog C' downwardly about the pivot 53 causing the latch control member engaging face 62 of blocking projection 60 to engage abutment 63 of control element 13ª. As the dog C' moves downwardly under the influence of the detent D into the secondary latch blocking or locking position shown in Figures 13 and 15 the control element 13ª is backed up or moved slightly in latching direction beyond its normal door latched position. This causes the cooperating abutment faces 15 and 16 to move apart slightly (see Figure 13) and insures that, when pressure on the actuating push button is removed, the detent D will move back in counterclockwise direction under the influence of spring 46 (omitted in Figures 12 and 13 but seen in Figures 9, 10 and 11) into its normal latch holding position seen in Figure 12 without interference from the abutment 16 of control element 13ª.

By providing means for backing up the latch unit, and particularly the portion thereof which is engaged by the detent, it is possible to provide clearance as seen at 64 (Figures 12 and 14) between the lower end 62 of the blocking projection 60 and the abutment 63 of latch control element 13ª and also to provide clearance as seen at 65 (Figure 12) between the blocking projection 60 and the detent D. It will be understood that this clearance is present only when the detent and latch unit are in their normal door latched positions as seen in Figures 9, 11 and 12 and that the clearance is taken up when the push button (either B or B') and detent D are idled into the positions shown in Figures 13 and 15. Our arrangement wherein the latch unit is backed up out of its normal door latched position during idling of the detent makes it possible to provide the clearances just described and these clearances take care of normal manufacturing tolerances and assembly variations and also permit free movement of the locking mechanism from latch free to initial latch blocking or locking position without undesirable resistance due to frictional engagement with the latch unit or the detent.

Although we have illustrated and described herein two embodiments of our invention, wherein the latch unit is backed up by movement of the detent caused by force exerted on the actuating push button or the like, it will be understood that in some instances it may be considered desirable to operate the latch unit blocking dog to cause it to engage and back up the latch unit, by means independent of the movement of the detent and its associated parts. It will also be understood that other modifications and variations may be made in the form and arrangement of the elements of our improved door control mechanism without departing from the spirit of our invention. Accordingly, we do not wish to be limited to the particular devices herein shown and described but claim as our invention all embodiments thereof coming within the scope of the appended claims.

We claim:

1. In a door control mechanism, a movable latch unit, a movable detent having a portion thereon for engaging said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a latch blocking dog supported for movement into and out of latch blocking position and additional latch unit backing-off movement from said latch blocking position, said dog having a detent engaging portion and a latch unit blocking portion and, when in said latch blocking position, having engagement with both said detent and said latch unit during at least a portion of the movement of said detent from latch holding to latch released position, and a dog actuating portion on said detent disposed to engage said detent engaging portion of said dog and to impart latch unit backing-off movement to said dog when said dog is in said latch blocking position and said detent is moved from latch holding to latch released position.

2. In a door control mechanism, a movable latch unit, a movable detent having a portion thereon for engaging said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a latch blocking dog supported for movement into and out of latch blocking position and additional latch unit backing-off movement from said latch blocking position, said dog having a detent engaging portion and a latch unit blocking portion and, when in said latch blocking position, having engagement with both said detent and said latch unit during at least a portion of the movement of said detent from latch holding to latch released position, a dog actuating portion on said detent disposed to engage said detent engaging portion of said dog and to impart latch unit backing-off movement to said dog when said dog is in said latch blocking position and said detent is moved from latch holding to latch released position and actuating means for moving said dog into and out of latch blocking position.

3. In a door control mechanism, a movable latch unit, a movable detent having a portion thereon for engaging said latch unit and a latch blocking member actuating portion, said latch unit having an operative or door latched position and an operated or door unlatched position and being movable therebetween in latching and unlatching directions, said detent having a latch holding position in which it maintains said latch unit in said operative or door latched position and a latch released position permitting movement of said latch unit in unlatching direction, a latch blocking member having a latch blocking position and a latch free position, said blocking member, when in said latch blocking position, being disposed to be engaged by said actuating portion of said detent upon movement thereof from latch holding position toward latch released position and having a portion disposed to engage and transmit an actuating force from said detent to said latch unit, means for supporting said latch unit whereby said latch unit is moved in latching direction by such actuating force, and means for selectively positioning said latch blocking member in either its said latch blocking or latch free positions.

4. In a door control mechanism, a latch unit having an operative or door latched position and an operated or door unlatched position and being movable therebetween in latching and unlatching directions, said latch unit including a latch member and a latch control element operatively associated with said latch member, a detent supported for movement between a latch holding position and a latch released position and having a portion adapted when said detent is in latch holding position to engage said control element and maintain said latch member in operative or door latched position and a latch blocking dog actuating portion, a latch blocking dog, means for supporting said dog for movement between a latch free position and a latch blocking position and for movement when in said latch blocking position in control element moving direction, said dog having a detent engaging portion and a latch blocking portion, said dog, when in latch blocking position, having said latch blocking portion positioned to engage said latch control element and said detent engaging portion positioned to be engaged by said actuating portion of said detent during at least a portion of the movement of said detent from latch holding to latch released position whereby, when said dog is in latch blocking position, movement of said detent from its latch holding toward its latch released position acts through said dog to move said latch control element in latching direction beyond the normal operative or door latched position thereof.

5. Door control mechanism including a frame, a movable latch unit, a movable detent operatively associated with said latch unit, said latch unit being supported by said frame and having an operative or door latched position and an operated or door unlatched position and being movable therebetween in latching and unlatching directions, said detent being supported by said frame and having a latch holding position in which it engages and maintains said latch unit in said operative or door latched position and being movable therefrom to a latch released position permitting movement of said latch unit in unlatching direction; and means for blocking said latch unit against movement from door latched to door unlatched position while permitting movement of said detent from latch holding position to latch released position and return, said blocking means comprising a dog member pivotally secured to said detent and having a latch unit engaging portion, a dog control member supported on said frame, said dog control member being movable to position said dog in latch blocking position or in latch free position, said dog, when in latch free position, having movement with said detent but being ineffective upon said latch unit to block same against movement from door latched to door unlatched position and, when in said latch blocking position, being disposed with said latch unit engaging portion in position whereby movement of said detent toward latch released position will move said latch unit engaging portion of said dog against said latch unit to move same in latching direction.

6. Door control mechanism including a frame, a movable latch unit, a movable detent operatively associated with said latch unit, said latch unit being supported by said frame and having an operative or door latched position and an operated or door unlatched position and being movable therebetween in latching and unlatching directions, said detent being supported by said frame and having a latch holding position in which it engages and maintains said latch unit in said operative or door latched position and being movable therefrom to a latch released position permitting movement of said latch unit in unlatching direction, and means for blocking said latch unit against movement from door latched to door unlatched position while permitting movement of said detent from latch holding position to latch released position and return, said blocking means comprising a latch blocking dog carried by said detent and movable therewith and control means for selectively controlling the path of movement of said dog during movement of said detent whereby, when said control means is in one selected position, said dog will move with said detent without interference with free movement of said latch unit from door latched toward door unlatched position and, when said control means is in another selected position, said dog will move with said detent and engage said latch unit during such movement and move same in latching direction.

7. In a door control mechanism, a movable latch unit, a movable detent having a portion thereon for engaging said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a movable support member, a latch blocking dog movably mounted on said support member, said movable support having one position in which said dog is maintained out of the paths of movement of said detent and said latch unit and another position in which said dog is positioned to engage both said detent and said latch unit during movement of said detent toward latch released position, and means for selectively positioning said support member in either of said positions.

8. In a door control mechanism, a movable latch unit, a movable detent having a portion thereon for engaging said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, a latch blocking dog, a movable support for said dog adapted when in one position to hold said dog in latch blocking position and when in another position to hold said dog in latch free position, and means for mounting said dog on said support for movement relative thereto, said dog having a latch unit engaging portion and a detent engaging portion, and, when held in latch blocking position by said movable support, being disposed to be engaged by both said latch unit and said detent whereby, when said detent is moved from latch holding toward latch released position said dog is moved relative to said support and engages and moves said latch unit in latching direction.

9. In a door control mechanism, a movable latch unit, a movable detent having a portion thereon for engaging said latch unit, said latch unit having an operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, and a latch blocking member supported for movement into and out of latch blocking position between said detent and said latch unit, said latch blocking member having a detent engaging portion and a latch unit engaging portion, said detent engaging portion being disposed in the path of movement of said detent and said latch unit engaging portion being disposed in the path of movement of said latch unit when said blocking member is in blocking position, said detent engaging portion having a cam face positioned, when said blocking member is in latch blocking position, to be engaged by said detent when said detent is moved from latch holding toward latch released position and to move said latch unit engaging portion of said blocking member in a direction to engage and move said latch unit in latching direction.

10. In a door control mechanism, a movable latch unit, a movable detent having a portion thereon for engaging said latch unit and a dog means actuating portion, said latch unit having a normal operative or door latched position and an operated or door unlatched position and being movable therebetween in latching and unlatching directions, said detent having a latch holding position in which it maintains said latch unit in said operative or door latched position and being movable therefrom to a latch released position permitting movement of said latch unit in unlatching direction, and dog means movable into and out of latch unit engaging position, said dog means having a portion adapted to engage said latch unit when in latch unit engaging position and another portion adapted to engage said dog means actuating portion of said detent when said dog means is in said latch unit engaging position and said detent is moved into said latch released position, and means for supporting said dog means for movement by said detent whereby said latch unit will be moved in backing-off direction beyond normal door latched position.

11. Door control mechanism including a latch unit supported for movement between an operative or door latched position and an operated or door unlatched position, detent means including a portion for engaging said latch unit and a dog actuating portion and being supported for movement between a latch holding position and a latch released position, said detent being adapted, when in latch holding position, releasably to hold said latch unit in said operative position, spring means disposed to urge said latch unit toward said operated or door unlatched position, a latch blocking dog supported for movement between a latch blocking position and a latch free position and independent movement with said detent, said dog having a detent engaging portion and a latch blocking portion and, when in said latch blocking position, having engagement with both said dog actuating portion of said detent and said latch unit during at least a portion of the movement of said detent from latch holding to latch released position, said dog, when in latch blocking position, being disposed to be moved by said actuating portion of said detent during at least a portion of the latch releasing movement of said detent in a direction to move said latch unit against said spring means, and actuating means for moving said dog into and out of latch blocking position.

12. In a door control mechanism, a movable latch unit, a movable detent having a portion thereon for engaging said latch unit and a latch blocking member actuating portion, said latch unit having an operative or door latched position and an operated or door unlatched position and being movable therebetween in latching and unlatching directions, said detent having a latch holding position in which it maintains said latch unit in said operative or door latched postion and being movable therefrom to a latch released position permitting movement of said latch unit in unlatching direction, a latch blocking member, and means for supporting said latch blocking member for movement between a latch blocking position and a latch free position and for independent movement by said detent, said blocking member, when in latch blocking position, having engagement with both said actuating portion of said detent and said latch unit during at least a portion of the movement of said detent from latch holding to latch released position, said blocking member being adapted to have further movement, independent of its said movement between latch blocking and latch free position, imparted thereto by movement of said detent toward its latch released direction, said further movement of said latch blocking member moving said latch unit in latching direction beyond its normal door latched position whereby return of said detent to its latch holding position is assured.

EDWIN L. ALLEN.
RUDOLPH I. SCHONITZER.

References Cited in the file of this patent
UNITED STATES PATENTS

| Number | Name | Date |
|---|---|---|
| 448,298 | Lecellier | Mar. 17, 1891 |
| 1,253,545 | Tompkins et al. | Jan. 15, 1918 |
| 1,688,246 | Platt | Oct. 16, 1928 |
| 2,344,532 | Brantingson | Mar. 21, 1944 |
| 2,552,815 | Roethel | May 15, 1951 |